(12) United States Patent
Sak et al.

(10) Patent No.: US 9,208,779 B2
(45) Date of Patent: Dec. 8, 2015

(54) MIXTURE OF N-GRAM LANGUAGE MODELS

(71) Applicant: Google Inc., Mountain View, CA (US)

(72) Inventors: Hasim Sak, New York, NY (US); Cyril Georges Luc Allauzen, Long Island City, NY (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 14/019,685

(22) Filed: Sep. 6, 2013

(65) Prior Publication Data

US 2015/0073788 A1    Mar. 12, 2015

(51) Int. Cl.
*G10L 15/00* (2013.01)
*G10L 15/197* (2013.01)
*G10L 15/06* (2013.01)

(52) U.S. Cl.
CPC ............. *G10L 15/197* (2013.01); *G10L 15/063* (2013.01); *G10L 2015/0631* (2013.01)

(58) Field of Classification Search
USPC .................................. 704/235–237, 245, 255
See application file for complete search history.

(56) References Cited

U.S. PATENT DOCUMENTS

| | | | |
|---|---|---|---|
| 8,977,537 B2 * | 3/2015 | Burges et al. ...................... | 704/9 |
| 2009/0192781 A1 * | 7/2009 | Bangalore et al. ................ | 704/2 |
| 2012/0223889 A1 * | 9/2012 | Medlock et al. ............. | 345/168 |
| 2012/0330647 A1 * | 12/2012 | Burges et al. ...................... | 704/9 |

OTHER PUBLICATIONS

Allauzen, Cyril et al., "Bayesian Language Model Interpolation for Mobile Speech Input,"Interspeech 2011, 4 pages.
Ballinger, Brandon et al., "On-Demand Language Model Interpolation for Mobile Speech Input," Interpseech 2010, 4 pages.
Bellegarda, Jerome "Statistical Language Model Adaptation: Review and Perspectives," Speech Communication vol. 42, Issue 1, Jan. 2004, 16 pages.
Iyer, R. et al., "Modeling Long Distance Dependence in Language: Topic Mixtures vs. Dynamic Cache Models," IEEE Transactions on Speech and Audio Processing, 1996, 4 pages.

(Continued)

*Primary Examiner* — Leonard Saint Cyr
(74) *Attorney, Agent, or Firm* — Fish & Richardson P.C.

(57) ABSTRACT

Methods, systems, and apparatus, including computer programs encoded on computer storage media, for creating a static language model from a mixture of n-gram language models. One of the methods includes receiving a set of development sentences W, receiving a set of language models $G_M$, determining a set of n-gram language model weights $\lambda_M$ based on the development sentences W and the set of language models $G_M$, determining a set of sentence cluster weights $\gamma_C$, each of the sentence cluster weights corresponding to a cluster in a set of sentence clusters, each cluster in the set of sentence clusters associated with at least one sentence from the set of development sentences W, and generating a language model from the set of language models $G_M$, the set of n-gram language model weights $\lambda_M$, the set of sentence clusters, and the set of sentence cluster weights $\gamma_C$.

20 Claims, 3 Drawing Sheets

(56) References Cited

OTHER PUBLICATIONS

Iyer, Rukmini et al., "Language Modeling with Sentence-Level Mixtures," Proceedings of the Workshop on Human Language Technology, 1994 (HLT '94), 7 pages.

Jaitly, Navdeep et al., "Application of Pretrained Deep Neural Networks to Large Vocabulary Conversational Speech Recognition," Department of Computer Science, University of Toronto, Mar. 12, 2012, 11 pages.

Kenser, Reinhard et al., "On the Dynamic Adaptation of Stochastic Language Models," IEEE International Conference on Acoustics, Speech, and Signal Processing, 1993, 4 pages.

Ng, Tim et al., "Web-Data Augmented Language Models for Mandarin Conversational Speech Recognition," IEEE International Conference on Acoustics, Speech, and Signal Processing, 2005, 4 pages.

Sak, Hasim et al., "Language Model Verbalization for Automatic Speech Recognition," IEEE International Conference on Acoustics, Speech, and Signal Processing, 2013, 5 pages.

Stolcke, Andreas, "Entropy-Based Pruning of Backoff Language Models," DARPA Broadcast News Transcription and Understanding Workshop, 1998, 5 pages.

Visweswariah, Karthik et al., "Language Models Conditioned on Dialog State," Eurospeech 2001, Scandinavia, 4 pages.

Wessel, Frank et al., "A Comparison of Dialogue-State Dependent Language Models," ESCA Workshop of Interactive Dialogue in Multi-Modal Systems, 1999, 4 pages.

Xu, Wei et al., "Language Modeling for Dialog System," International Conference on Spoken Language Processing, Interspeech 2000, 5 pages.

* cited by examiner

MIXTURE OF N-GRAM LANGUAGE MODELS

BACKGROUND

Speech recognition systems transcribe spoken words into text in a process that is known as automatic speech recognition. Some speech recognition systems are trained when an individual speaker reads sections of text, and the speech recognition system uses the terms and phrases spoken by the user to select a recognition algorithm for the speaker.

Some speech recognition applications include voice dialing, call routing, search, and speech-to-text processing. For example, a user can draft an email or a document using a speech recognition system.

SUMMARY

In general, one innovative aspect of the subject matter described in this specification can be embodied in methods that include the actions of receiving a set of development sentences W, receiving a set of language models $G_M$, determining a set of n-gram language model weights $\lambda_M$ based on the development sentences W and the set of language models $G_M$, determining a set of sentence cluster weights $\gamma_C$, each of the sentence cluster weights corresponding to a cluster in a set of sentence clusters, each cluster in the set of sentence clusters associated with at least one sentence from the set of development sentences W, and generating a language model from the set of language models $G_M$, the set of n-gram language model weights $\lambda_M$, the set of sentence clusters, and the set of sentence cluster weights $\gamma_C$. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may comprise determining, for each sentence in the set of development sentences W, a probability p of the sentence based on the set of n-gram language model weights $\lambda_M$, and the set of sentence cluster weights $\gamma_C$. The probability p of the sentence w from the set of development sentences W may satisfy Equation (1) below.

$$p(w) = \Pi_{i=1}^{|w|} \Sigma_{m=1}^{M} \alpha_{m,h_i} p_m(w_i | h_i) \quad (1)$$

In Equation (1), $\alpha_{m,h_i}$, $p(c|h_i)$, and $p(h_i|c)$ satisfy Equations (2), (3), and (4) respectively.

$$\alpha_{m,h_i} = \sum_{c=1}^{C} p(c | h_i) \lambda_{c,m} \quad (2)$$

$$p(c | h_i) = \frac{p(h_i | c) \gamma_c}{\sum_{c=1}^{C} p(h_i | c) \gamma_c} \quad (3)$$

$$p(h_i | c) = \prod_{j=1}^{i} \sum_{m=1}^{M} \lambda_{c,m} p_m(w_j | h_j) \quad (4)$$

In Equations (1), (2), (3) and (4), $\lambda$ is the n-gram language model weight, $\gamma$ is the sentence cluster weight, C is the quantity of clusters in the set of sentence clusters, M is the quantity of language models in the set of language models $G_M$, |w| is the quantity of n-grams in the sentence w, and $p_m(w_i|h_i)$ is the probability that n-gram $w_i$ follows history $h_i$ as estimated by a language model $G_m$ from the set of language models $G_M$.

In some implementations, the method comprises maximizing a combination of the probabilities by repeating the determination of at least one of the weights in the set of n-gram language model weights $\lambda_M$, the determination of at least one of the weights in the set of sentence cluster weights $\gamma_C$, and the probabilities $p_w$ of the sentences in the set of development sentences W. Maximizing the combination of the probabilities may comprise maximizing a product of the probabilities.

In some implementations, each of the n-gram language model weights $\lambda_m$ from n-gram language model weights $\lambda_M$ satisfy Equation (5) below.

$$\lambda'_{c,m} = \frac{1}{|c|} \sum_{w \in c} \sum_{i=1}^{|w|} \frac{\lambda_{c,m} p_m(w_i | h_i)}{\sum_{j=1}^{M} \lambda_{c,j} p_j(w_j | h_j)} \quad (5)$$

In Equation (5), each of the sentence cluster weights $\gamma_C$ from the set of sentence cluster weights $\gamma_C$ satisfy Equation (6) below.

$$\gamma_c = \frac{|c|}{|W|} \quad (6)$$

In Equations (5) and (6), c is one of the clusters in the set of sentence clusters, |c| is the number of sentences in cluster c, m is a language model from the set of language models $G_M$, M is the quantity of language models in the set of language models $G_M$, |W| is the quantity of sentences in set of development sentences W, |w| is the quantity of n-grams in the sentence w from the set of development sentences W, and $p_m(w_i|h_i)$ is the probability that n-gram $w_i$ follows history $h_i$ as estimated by a language model $G_m$ from the set of language models $G_M$. Each of the n-gram language model weights $\lambda_m$ from n-gram language model weights $\lambda_M$ may satisfy Equation (7) below.

$$\lambda'_{c,m} = \frac{1}{N_c} \sum_{w \in W} p(c | w) \sum_{i=1}^{|w|} \frac{\lambda_{c,m} p_m(w_i | h_i)}{\sum_{j=1}^{M} \lambda_{c,j} p_j(w_j | h_j)} \quad (7)$$

In Equation (7), each of the sentence cluster weights $\gamma_c$ from the set of sentence cluster weights $\gamma_C$ may satisfy Equation (8) below.

$$\gamma'_c = \frac{1}{|W|} \sum_{w \in W} p(c | w) \quad (8)$$

In Equations (7) and (8), $N_c$, $p(c|w)$, and $p_c(w)$ satisfy Equations (9), (10), and (11) respectively.

$$N_c = \sum_{w \in W} p(c|w)|w| \qquad (9)$$

$$p(c|w) = \frac{\gamma_c p_c(w)}{\sum_{i=1}^{C} \gamma_i p_i(w)} \qquad (10)$$

$$p_c(w) = \prod_{i=1}^{|w|} \sum_{m=1}^{M} \lambda_{c,m} p_m(w_i | h_i) \qquad (11)$$

In Equations (7), (8), (9), (10), and (11), c is one of the clusters in the set of sentence clusters, C is the quantity of clusters in the set of sentence clusters, m is a language model from the set of language models $G_M$, M is the quantity of language models in the set of language models $G_M$, |w| is the quantity of n-grams in the sentence w from the set of development sentences W, and $p_m(w_i|h_i)$ is the probability that n-gram $w_i$ follows history $h_i$ as estimated by a language model $G_m$ from the set of language models $G_M$.

In some implementations, the method comprises receiving a digital representation of speech, generating a transcription of the digital representation of speech using the generated language model, and performing an action based on the transcription. The method may comprise training, prior to receiving the set of language models $G_M$, each of the language models in the set of language models $G_M$, each of the language models in the set of language models $G_M$ trained from a different corpus.

The subject matter described in this specification can be implemented in particular embodiments so as to realize one or more of the following advantages. In some implementations, a single static n-gram language model may be generated to optimize the probability of the sentences in a set of development sentences without knowledge of the tasks or context associated with the sentences. In some implementations, a static n-gram language model is used to transcribe spoken utterances to reduce the computation required for the transcription. In some implementations, a single static n-gram language model is generated from source corpora including sentences where there is no document structure for topic models. In some implementations, a single static n-gram language model may transcribe spoken utterances associated with a diverse set of task domains.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Speech enabled interfaces on electronic devices allow users to accomplish may different tasks using automatic speech recognition systems. For example, a user may perform web search, e-mail or SMS dictation, location or business search, application search, or voice actions (e.g., "Set alarm to 8 am") using a speech enabled interface, among others.

To allow the automatic speech recognition system to use a single static n-gram language model when generating text from speech, independent from the task or domain associated with the speech, the static n-gram language model is generated from multiple domain specific n-gram language models, where each of the domain specific n-gram language models is associated with a specific task and/or domain. When the automatic speech recognition system uses the static n-gram language model to transcribe a spoken utterance, the static n-gram language model employs the appropriate domain specific n-gram language model to transcribe the spoken utterance.

The static n-gram language model is generated from the domain specific n-gram language models with a development set of sentences that are used to determine domain specific language model weights, sentence clusters, and sentence cluster weights. For example, five domain specific n-gram language models may be trained from five separate data sources and used with the development set of sentences to train the static n-gram language model.

Figure 1:
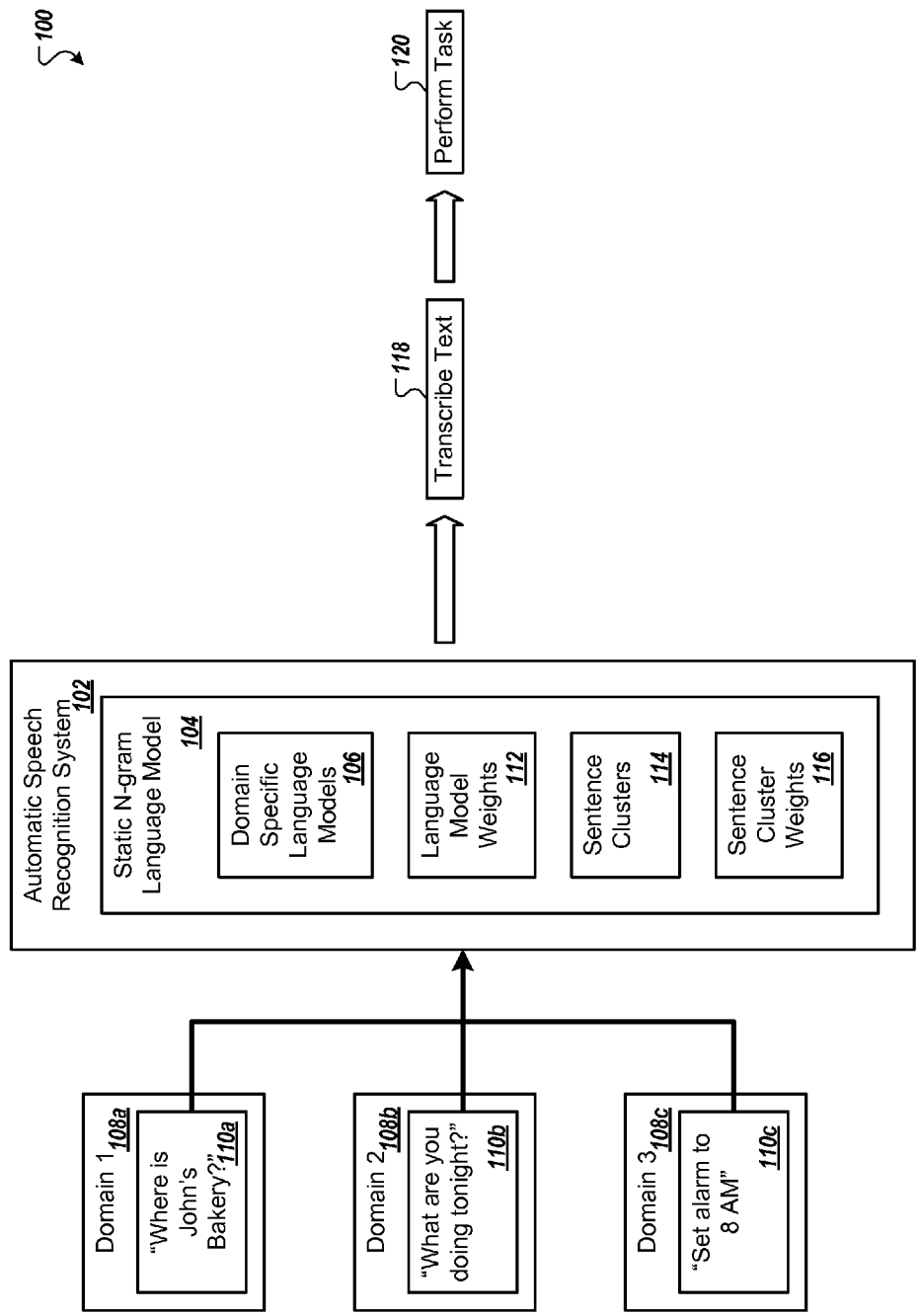
FIG. 1 is an example of an environment in which a static n-gram language model is generated from multiple domain specific language models.

FIG. 1 is an example of an environment 100 in which a static n-gram language model is generated from multiple domain specific language models. For example, the environment 100 includes an automatic speech recognition system 102 that generates a static n-gram language model 104 using a plurality of domain specific language models 106 and domain data 108a-c.

When the automatic speech recognition system 102 generates the static n-gram language model 104, the automatic speech recognition system 102 receives a plurality of sentences 110a-c from the domain data 108a-c as a development set, e.g., as a development set of sentences. The automatic speech recognition system 102 uses the sentences 110a-c and the domain specific language models 106 as input to determine a plurality of domain specific language model weights 112, a plurality of sentence clusters 114, and a plurality of sentence cluster weights 116.

For example, the automatic speech recognition system 102 associates each of the sentences 110a-c with at least one of the sentence clusters 114 and determines values for the domain specific language model weights 112 and the sentence cluster weights 116 that maximize a combination of the probabilities of the sentences 110a-c where each of the probabilities represent the likelihood of the corresponding sentence being generated by the automatic speech recognition system 102.

In some examples, the automatic speech recognition system 102 may receive the set of development sentences W from the domain data 108a-c and associate each of the sentences 110a-c to one of C clusters based on the cluster c whose weights maximize the probability of the sentence. For example, each of the clusters is associated with only one of the weights from the sentence cluster weights 116, e.g., there are C sentence cluster weights 116, and each of the domain specific language model weights 112 is associated with both a cluster c and a language model m, e.g., for M language models there are a total of C×M domain specific language model weights 112.

The automatic speech recognition system 102 may then calculate updated values for the domain specific language model weights 112 and the sentence cluster weights 116 based on the sentences associated with each of the clusters. For example, the automatic speech recognition system 102 may use an expectation maximization algorithm, described with reference to FIG. 2 below, to calculate the updated weight values. The automatic speech recognition system 102 may use any appropriate algorithm to determine updated weight values.

The automatic speech recognition system 102 may repeat the association of each of the sentences in the set of development sentences W to one of the clusters and the determination of the updated weight values for the domain specific language model weights 112 and the sentence cluster weights 116 for a predetermined number of iterations or until a change in a combination of the probabilities is less than a threshold value.

After generation of the static n-gram language model 104, when the automatic speech recognition system 102 receives a digital representation of speech, e.g., of a spoken query, the automatic speech recognition system 102 uses the static n-gram language model 104 to generate transcribed text 118. For example, when the automatic speech recognition system 102 executes on a mobile device and receives the sentence "Where is John's Bakery?", the automatic speech recognition system 102 generates the transcribed text 118 using the static n-gram language model 104.

Continuing the example, the mobile device may use the transcribed text 118 to perform a task 120. For example, the mobile device may determine that the transcribed text 118 represents a query based on the n-grams in the text, e.g., "Where is John's Bakery?", and that the query is associated with a map application. The mobile device may then execute the map application and provide the map application with the transcribed text 118, allowing the map application to present the location of "John's Bakery" to a user of the mobile device.

In some implementations, a different component of the environment 100 generates the static n-gram language model 104. For example, a training system may generate the static n-gram language model 104 and provide the static n-gram language model and the automatic speech recognition system 102 to another system. In some examples, a first computer generates the static n-gram language model 104, creates the automatic speech recognition system 102 using the static n-gram language model, and provides the automatic speech recognition system 102 to a second computer, e.g., a mobile device.

The environment 100 may include an electronic device that executes the automatic speech recognition system 102. The electronic device may include a personal computer, a mobile communication device, and other devices that receive digital representations of speech, e.g., an utterance from a user of the electronic device.

In some implementations, the electronic device may receive the digital representation of speech and provide the digital representation of speech to another device that executes the automatic speech recognition system 102. For example, a server that connects to the electronic device may execute the automatic speech recognition system 102.

In some implementations, a combination of all the sentence cluster weights for each cluster is a predetermined value. For example, a sum of the sentence cluster weights for each cluster is one.

Figure 2:
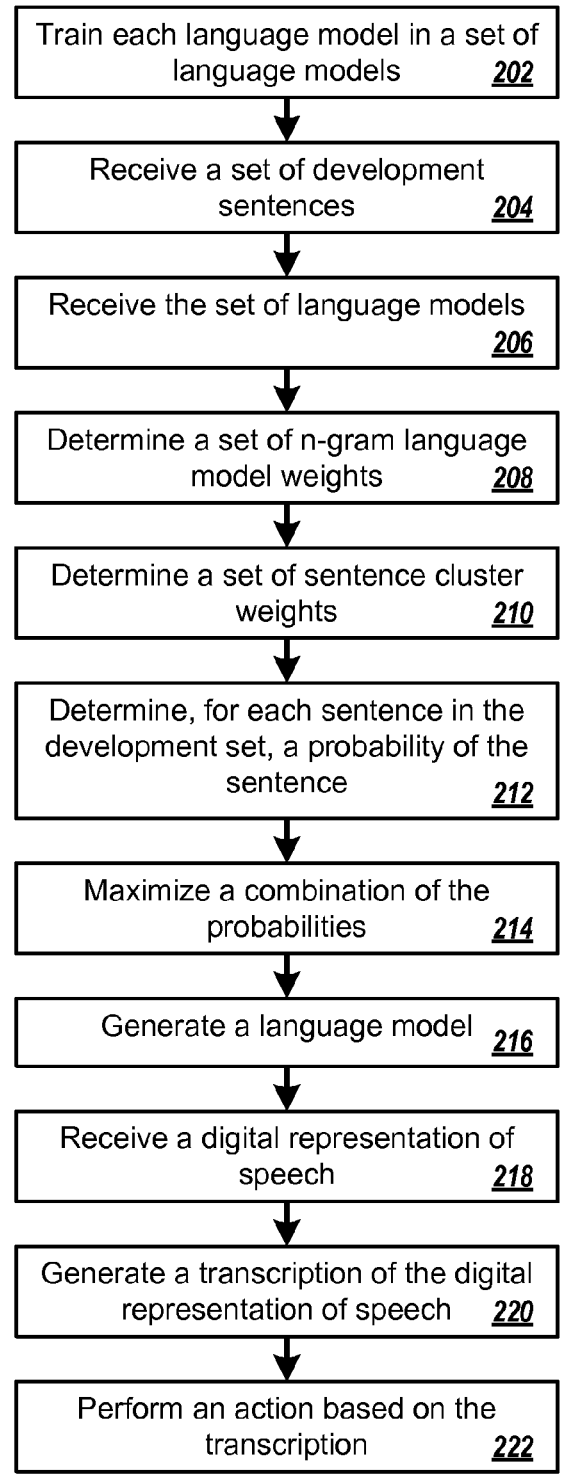
FIG. 2 is a flow diagram of a process for generating a static language model from a plurality of language models.

FIG. 2 is a flow diagram of a process 200 for generating a static language model from a plurality of language models. For example, the process 200 can be used by the automatic speech recognition system 102 from the environment 100.

The process trains each language model in a set of language models (202). Each of the language models in the set of language models $G_M$ is trained from a different corpus. In some implementations, each corpus is associated with a different source of data. In some implementations, multiple corpora are associated with the same source of data. Some examples of sources of data include typed queries, e.g., either question-like or non-question-like queries, SMS messages, voice actions, map queries, transcribed queries, transcribed messages, and web content, e.g., web pages, to name of few.

In some implementations, each of the sources of data used to train the language models in the set of language models $G_M$ is associated with a different domain. For example, a first domain may be a set of e-commerce related web pages and a second domain may be a set of news related web pages. In some implementations, some of the sources of data are associated with the same domain.

In some examples, each of the language models in the set of language models $G_M$ is represented by a neural network. The language models in the set of language models $G_M$ may be represented by any appropriate model.

In some implementations, one or more of the language models in the set of language models $G_M$ is trained by another system. For example, each of the language models in the set of language models $G_M$ may be trained by a domain specific language model training system associated with the particular data source used to train the language model The process receives a set of development sentences (204). For example, the automatic speech recognition system receives a set of development sentences W. In some examples, the automatic speech recognition system receives the set of development sentences W from the same sources of data used to train the language models in the set of language models $G_M$.

In some implementations, another system receives the set of development sentences W. For example, when a training system generates the static n-gram language model, e.g., performs step 216 below, the training system may receive the set of development sentences W.

The process receives the set of language models (206). For example, the automatic speech recognition system receives a set of language models $G_M$. In some examples, when a training system generates the static n-gram language model, e.g., performs step 216 below, the training system receives each of the data source specific language models in the set of language models $G_M$ from the domain specific language model training systems that trained the source specific language models.

The process determines a set of n-gram language model weights (208). The set of n-gram language model weights $\lambda_M$ is based on the development sentences W and the set of language models $G_M$. For example, the automatic speech recognition system determines the set of n-gram language model weights $\lambda_M$ where each of the n-gram language model weights $\lambda_M$ is associated with one of the language models from the set of language models $G_M$ and multiple weights are associated with the same language model, e.g., C of the n-gram language model weights $\lambda_m$ are associated with the same language model $G_m$.

In some implementations, the automatic speech recognition system or the training system randomly selects C sentences from the set of development sentences W and estimates each of the weights in the set of n-gram language model weights $\lambda_M$. For example, the weights in the set of n-gram language model weights $\lambda_M$ are estimated to determine a predetermined property of the weights, e.g., a maximum of the probability of the randomly selected C sentences or a minimum of a probability of error of the randomly selected C sentences.

In some implementations, the automatic speech recognition system or the training system initializes each of the weights in the set of n-gram language model weights $\lambda_M$ randomly. For example, the training system randomly selects values between zero and one for each of the weights in the set of n-gram language model weights $\lambda_M$.

The process determines a set of sentence cluster weights (210). For the set of sentence cluster weights $\gamma_C$, each of the sentence cluster weights $\gamma_C$ corresponds to a cluster in a set of sentence clusters and each cluster c in the set of sentence clusters is associated with at least one sentence from the set of development sentences W. For example, the automatic speech recognition system determines the set of sentence cluster weights $\gamma_C$ where there are C sentence cluster weights $\gamma_C$ and one of the sentence cluster weights $\gamma_c$ corresponds to each of the clusters c.

In some implementations, when the automatic speech recognition system or the training system randomly selects C sentences from the set of development sentences W, each of the weights in the set of sentence cluster weights $\gamma_C$ is based on the quantity of sentences associated with the corresponding cluster and the total quantity of sentences in the set of development sentences W. For example, each of the sentences in the set of development sentences W is associated with one of the clusters c and each of the sentence cluster weights $\gamma_c$ from the set of sentence cluster weights $\gamma_C$ is shown in Equation (12), below.

$$\gamma_c = \frac{|c|}{|W|} \qquad (12)$$

In Equation (12), |c| is the quantity of sentences in cluster c and |W| is the quantity of sentences in the set of development sentences W.

In some implementations, when some of the steps in the process 200 are performed multiple times, the weights in the set of n-gram language model weights $\lambda_M$ and the weights in the set of sentence cluster weights $\gamma_C$ are determined using an iterative process. For example, when each of the sentences in the set of development sentences W is associated with a cluster c, each of the update n-gram language model weights $\lambda_{c,m}'$ from n-gram language model weights $\lambda_M$ is shown in Equation (13), below.

$$\lambda'_{c,m} = \frac{1}{|c|} \sum_{w \in c} \sum_{i=1}^{|w|} \frac{\lambda_{c,m} p_m(w_i \mid h_i)}{\sum_{j=1}^{M} \lambda_{c,j} p_j(w_j \mid h_j)} \qquad (13)$$

Each of the sentence cluster weights $\gamma_c$ from the set of sentence cluster weights $\gamma_C$ is shown in Equation (14), below.

$$\gamma_c = \frac{|c|}{|W|} \qquad (14)$$

In Equations (13) and (14), $\lambda_{c,m}$ is the previous n-gram language model weight, c is one of the clusters in the set of sentence clusters, |c| is the number of sentences in cluster c, m is a language model from the set of language models $G_M$, M is the quantity of language models in the set of language models $G_M$, |W| is the quantity of sentences in set of development sentences W, |w| is the quantity of n-grams in the sentence w from the set of development sentences W, and $p_m(w_i|h_i)$ is the probability that n-gram $w_i$ follows history $h_i$ as estimated by a language model $G_m$ from the set of language models $G_M$.

For example, the training system may assign each sentence w from the set of development sentences W to the cluster c whose associated weights maximize the probability of the corresponding sentence, where for each sentence w in a set of sentences $S_c$ for each cluster c, $S_c = \{w: p_c(w) \geq p_i(w), \forall 1 \leq i \leq C\}$. The training system may then calculate the updated n-gram language model weights $\lambda_{c,m}'$ for each cluster to optimize the probability of the sentences in each cluster c and the updated sentence cluster weights $\gamma_c$.

In some implementations, the automatic speech recognition system or the training system initializes each of the weights in the set of sentence cluster weights $\gamma_C$ randomly. In some implementations, when the automatic speech recognition system or the training system initializes each of the weights in the set of sentence cluster weights $\gamma_C$ randomly and some of the steps in the process 200 are performed multiple times, each of the updated n-gram language model weights $\lambda_{c,m}'$ from n-gram language model weights $\lambda_M$ is shown in Equation (15), below.

$$\lambda'_{c,m} = \frac{1}{N_c} \sum_{w \in W} p(c \mid w) \sum_{i=1}^{|w|} \frac{\lambda_{c,m} p_m(w_i \mid h_i)}{\sum_{j=1}^{M} \lambda_{c,j} p_j(w_j \mid h_j)} \qquad (15)$$

Each of the updated sentence cluster weights $\gamma_c'$ from the set of sentence cluster weights $\gamma_C$ is shown in Equation (16), below.

$$\gamma'_c = \frac{1}{|W|} \sum_{w \in W} p(c \mid w) \qquad (16)$$

In Equation (15), $N_c$ is shown in Equation (17), below.

$$N_c = \sum_{w \in W} p(c|w)|w| \qquad (17)$$

In Equations (15), (16), and (17) p(c|w) is shown in Equation (18), below.

$$p(c \mid w) = \frac{\gamma_c p_c(w)}{\sum_{i=1}^{C} \gamma_i p_i(w)} \qquad (18)$$

In Equation (18), $p_c(w)$ is shown in Equation (19), below.

$$p_c(w) = \Pi_{i=1}^{|w|} \Sigma_{m=1}^{M} \lambda_{c,m} p_m(w_i|h_i) \qquad (19)$$

In Equations (15), (16), (17), (18), and (19), c is one of the clusters in the set of sentence clusters, C is the quantity of clusters in the set of sentence clusters, m is a language model from the set of language models $G_M$, M is the quantity of language models in the set of language models $G_M$, |w| is the quantity of n-grams in the sentence w from the set of development sentences W, and $p_m(w_i|h_i)$ is the probability that n-gram $w_i$ follows history $h_i$ as estimated by a language model $G_m$ from the set of language models $G_M$.

For example, the training system randomly generates the initial values for the n-gram language model weights $\lambda_c$ and the sentence cluster weights $\gamma_c$ and iteratively updates the weight values.

The training system may iteratively determine the updated n-gram language model weights $\lambda_{c,m}'$ and the updated sentence cluster weights $\gamma_c$ for a predetermined quantity of iterations or until a difference between two sequential sets of values is less than a threshold value. For example, the training system may determine the updated weights until a difference between two sequential combinations of the probabilities of the sentences is below a threshold difference value. In some examples, the training system may determine the updated weights until a total difference between two sequential sets of weights is below a threshold difference value or until a greatest difference between corresponding weights in the two sequential sets of weights is below a threshold difference value, e.g., the differences between $\lambda_{c,m}'$ and $\lambda_{c,m}$ for all of the weights in the set of n-gram language model weights $\lambda_M$ is below a threshold difference value.

The process determines, for each sentence in the development set, a probability of the sentence (212). For example, the automatic speech recognition system determines, for each sentence in the set of development sentences W, a probability p of the sentence. The probability of a sentence may represent the probability that the sentence will be generated by the static n-gram language model based on the current weight values.

In some implementations, the probabilities may be determined by a different component. For example, the training system may determine the probability of each sentence in the set of development sentences W.

In some implementations, the probability p of the sentence w from the set of development sentences W is shown in Equation (20), below.

$$p(w) = \Pi_{i=1}^{|w|} \Sigma_{m=1}^{M} \alpha_{m,h_i} p_m(w_i|h_i) \quad (20)$$

In Equation (20) $\alpha_{m,h_i}$ is shown in Equation (21), below, $p(c|h_i)$ is shown in Equation (22), below, and $p(h_i|c)$ is shown in Equation (23), below. For example, the process 200 may use Bayesian language model interpolation to build a statically interpolated n-gram language model using the estimated cluster mixture weights.

$$\alpha_{m,h_i} = \sum_{c=1}^{C} p(c \mid h_i) \lambda_{c,m} \quad (21)$$

$$p(c \mid h_i) = \frac{p(h_i \mid c)\gamma_c}{\sum_{c=1}^{C} p(h_i \mid c)\gamma_c} \quad (22)$$

$$p(h_i \mid c) = \prod_{j=1}^{i} \sum_{m=1}^{M} \lambda_{c,m} p_m(w_j \mid h_j) \quad (23)$$

In Equations (20), (21), (22), and (23), $\lambda$ is the n-gram language model weight, $\gamma$ is the sentence cluster weight, C is the quantity of clusters in the set of sentence clusters, M is the quantity of language models in the set of language models $G_M$, $|w|$ is the quantity of n-grams in the sentence w, and $p_m(w_i|h_i)$ is the probability that n-gram $w_i$ follows history $h_i$ as estimated by a language model $G_m$ from the set of language models $G_M$.

The process maximizes a combination of the probabilities (214). For example, the automatic speech recognition system or the training system maximizes a combination of the probabilities by repeating the determination of at least one of the weights in the set of n-gram language model weights $\lambda_M$, the determination of at least one of the weights in the set of sentence cluster weights $\gamma_C$, and the probabilities $p_w$ of the sentences in the set of development sentences W.

In some implementations, the combination of the probabilities is shown in Equation (24), below.

$$\arg\max L(\theta;W) = \arg\max p(W|\theta) = \arg\max \Pi_{w \in W} p(w|\theta) \quad (24)$$

In Equation (24), $\theta = \{\alpha_c, \lambda_{c,m}: 1 \leq c \leq C, 1 \leq m \leq M\}$, C is the quantity of clusters in the set of sentence clusters, and M is the quantity of language models in the set of language models $G_M$.

In some implementations, the process 200 performs steps 208 through 212 iteratively to maximize the combination of the probabilities. For example, the process 200 iteratively updates the n-gram language model weights $\lambda_m$ and the sentence cluster weights $\gamma_c$ to determine updated probabilities for each of the sentences in the set of development sentences W.

In some implementations, maximizing the combination of the probabilities comprises maximizing a product of the probabilities. For example, maximization of the product of the probabilities is shown in Equation (25), below.

$$\arg\max L(W) = \arg\max \Pi_{w \in W} p(w) \quad (25)$$

In some implementations, maximizing the combination of the probabilities comprises maximizing a sum of the probabilities. For example, the maximization of the sum of the probabilities is shown in Equation (26), below.

$$\arg\max L(W) = \arg\max \Sigma_{w \in W} p(w) \quad (26)$$

In some implementations, the process uses the expectation maximization algorithm to maximize the combination of the probabilities. The process may use any appropriate algorithm to maximize the combination of the probabilities.

In some implementations, the process determines a different property of the combination of the probabilities. For example, the process may minimize the probability of error for each of the sentences in the set of development sentences W.

The process generates a language model (216). The language model is generated from the set of language models $G_M$, the set of n-gram language model weights $\lambda_M$, and the set of sentence cluster weights $\gamma_C$. For example, the automatic speech recognition system generates the language model. In some implementations, the language model is generated from the set of sentence clusters.

The process receives a digital representation of speech (218). For example, when the training system generates the language model, the training system may provide the language model to the automatic speech recognition system and the automatic speech recognition system may use the language model to transcribe the digital representation of speech.

The process generates a transcription of the digital representation of speech (220). The transcription of the digital representation of speech is produced using the generated language model. For example, the automatic speech recognition system generates the transcription using the generated static n-gram language model.

The process performs an action based on the transcription (222). For example, the automatic speech recognition system provides the transcription to another component in the device executing the automatic speech recognition system and the other component performs an action based on the transcription.

For example, when a user instructs a mobile device to "Set alarm to 8 am," the automatic speech recognition system receives a digital representation of the instructions, transcribes the instructions using the generated static n-gram language model, and provides the transcription to a component on the mobile device, e.g., a task component. The task component breaks the transcription into parts, such as "alarm" and "8 am," and sets an alarm on the mobile device to 8 am.

The automatic speech recognition system may execute on the mobile device. In some examples, the automatic speech recognition system executes on another device, e.g., a server.

The order of steps in the process 200 described above is illustrative only, and the generation of the language model from the plurality of language models can be performed in different orders. For example, the process 200 may receive the set of language models $G_M$ and then receive the set of development sentences W. In some examples, the process 200 receives the set of developments sentences W and then trains each language model in the set of language models $G_M$.

In some implementations, the process 200 can include additional steps, fewer steps, or some of the steps can be divided into multiple steps. For example, the process may perform steps 204 through 216 without performing steps 202 and 218 through 222. In some implementations, while maximizing the combination of the probabilities, the process 200 iteratively performs steps 208 through 212.

In some implementations, the process 200 converges to a maximum probability estimation for the weight values. In some implementations, the maximum probability estimation is a local maximum. In some implementations, the maximum probability estimation is a global maximum.

In some implementations, the process 200 randomly restarts the iterative process to determine whether a maximum probability estimation is a local or a global maximum. For example, the training system may randomly select C sentences from the set of development sentences W and perform steps 208 through 214 based on the randomly selected sentences to determine whether a previous maximum probability estimation was a local or a global maximum. One or more of the C sentences are different than the sentences initially selected for the previous maximum probability estimation.

In some examples, the training system randomly selects weight values for the n-gram language model weights $\lambda_m$ and the sentence cluster weights $\gamma_c$ and performs steps 208 through 214 to determine whether a previous maximum probability estimation was a local or a global maximum. One or more of the weight values are different than the weights initially selected for the previous maximum probability estimation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 3:
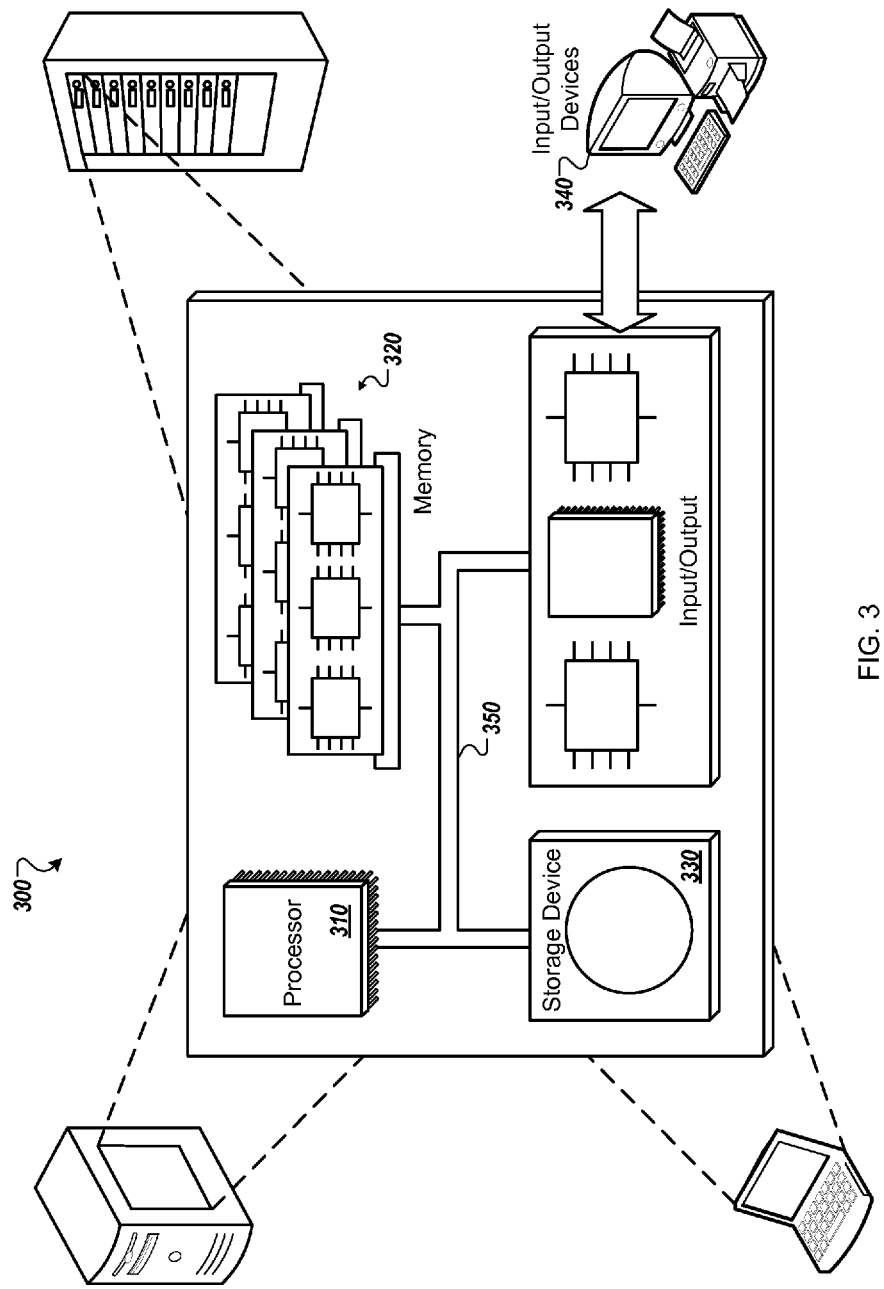
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implement methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, by a training system, a set of development sentences W;
receiving a set of two or more language models $G_M$, each language model in the set of two or more language models $G_M$ for use by an automatic speech recognition system when generating text from speech;
determining a set of n-gram language model weights $\lambda_M$ using the development sentences W and the set of two or more language models $G_M$;
determining a set of sentence cluster weights $\gamma_C$, each of the sentence cluster weights corresponding to a cluster in a set of sentence clusters, each cluster in the set of sentence clusters associated with at least one sentence from the set of development sentences W;
generating a language model from the set of two or more language models $G_M$, the set of n-gram language model weights $\lambda_M$, the set of sentence clusters, and the set of sentence cluster weights $\gamma_C$; and providing, by the training system, the language model for use by a particular automatic speech recognition system to determine n-grams included in an utterance encoded in an audio signal.

2. The method of claim 1, further comprising:

determining, for each sentence in the set of development sentences W, a probability p of the sentence using the set of n-gram language model weights $\lambda_M$, and the set of sentence cluster weights $\gamma_C$.

3. The method of claim 2, wherein the probability p of the sentence w from the set of development sentences W satisfies $$p(w) = \prod_{i=1}^{|w|} \sum_{m=1}^{M} \alpha_{m,h_i} p_m(w_i \mid h_i)$$

where $$\alpha_{m,h_i} = \sum_{c=1}^{C} p(c \mid h_i) \lambda_{c,m},$$

$$p(c \mid h_i) = \frac{p(h_i \mid c)\gamma_c}{\sum_{c=1}^{C} p(h_i \mid c)\gamma_c},$$

$$p(h_i \mid c) = \prod_{j=1}^{i} \sum_{m=1}^{M} \lambda_{c,m} p_m(w_j \mid h_j),$$

$\lambda$ is the n-gram language model weight, $\gamma$ is the sentence cluster weight, C is the quantity of clusters in the set of sentence clusters, M is the quantity of language models in the set of two or more language models $G_M$, $|w|$ is the quantity of n-grams in the sentence w, and $p_m(w_i|h_i)$ is the probability that n-gram $w_i$ follows history $h_i$ as estimated by a language model $G_m$ from the set of two or more language models $G_M$.

4. The method of claim 2, further comprising:

maximizing a combination of the probabilities by repeating the determination of at least one of the weights in the set of n-gram language model weights $\lambda_M$, the determination of at least one of the weights in the set of sentence cluster weights $\gamma_C$, and the probabilities $p_w$ of the sentences in the set of development sentences W.

5. The method of claim 4, wherein maximizing the combination of the probabilities comprises maximizing a product of the probabilities.

6. The method of claim 4, wherein:

each of the n-gram language model weights $\lambda_m$ from n-gram language model weights $\lambda_M$ satisfies $$\lambda'_{c,m} = \frac{1}{|c|} \sum_{w \in c} \sum_{i=1}^{|w|} \frac{\lambda_{c,m} p_m(w_i \mid h_i)}{\sum_{j=1}^{M} \lambda_{c,j} p_j(w_j \mid h_j)},$$

and each of the sentence cluster weights $\gamma_c$ from the set of sentence cluster weights $\gamma_C$ satisfies $$\gamma_c = \frac{|c|}{|W|},$$

where c is one of the clusters in the set of sentence clusters, $|c|$ is the quantity of sentences in cluster c, m is a language model from the set of two or more language models $G_M$, M is the quantity of language models in the set of two or more language models $G_M$, $|W|$ is the quantity of sentences in set of development sentences W, $|w|$ is the quantity of n-grams in the sentence w from the set of development sentences W, and $p_m(w_i|h_i)$ is the probability that n-gram $w_i$ follows history $h_i$ as estimated by a language model $G_m$ from the set of two or more language models $G_M$.

7. The method of claim 4, wherein:

each of the n-gram language model weights $\lambda_m$ from n-gram language model weights $\lambda_M$ satisfies $$\lambda'_{c,m} = \frac{1}{N_c} \sum_{w \in W} p(c \mid w) \sum_{i=1}^{|w|} \frac{\lambda_{c,m} p_m(w_i \mid h_i)}{\sum_{j=1}^{M} \lambda_{c,j} p_j(w_j \mid h_j)},$$

and each of the sentence cluster weights $\gamma_c$ from the set of sentence cluster weights $\gamma_C$ satisfies $$\gamma'_c = \frac{1}{|W|} \sum_{w \in W} p(c \mid w),$$

where $$N_c = \sum_{w \in W} p(c \mid w)|w|,$$

$$p(c \mid w) = \frac{\gamma_c p_c(w)}{\sum_{i=1}^{C} \gamma_i p_i(w)},$$

$$p_c(w) = \prod_{i=1}^{|w|} \sum_{m=1}^{M} \lambda_{c,m} p_m(w_i \mid h_i),$$

c is one of the clusters in the set of sentence clusters, C is the quantity of clusters in the set of sentence clusters, m is a language model from the set of two or more language models $G_M$, M is the quantity of language models in the set of two or more language models $G_M$, $|w|$ is the quantity of n-grams in the sentence w from the set of development sentences W, and $p_m(w_i|h_i)$ is the probability that n-gram $w_i$ follows history $h_i$ as estimated by a language model $G_m$ from the set of two or more language models $G_M$.

8. The method of claim 1, further comprising training, prior to receiving the set of two or more language models $G_M$, each of the language models in the set of two or more language models $G_M$, each of the language models in the set of two or more language models $G_M$ trained from a different corpus.

9. The method of claim 1, wherein:

receiving the set of two or more language models $G_M$ comprises receiving the set of two or more language models $G_M$, each language model in the set of two or more language models $G_M$ for use by an automatic speech recognition when generating text from speech for a particular task; and providing the language model for use by the particular automatic speech recognition system to determine n-grams included in an utterance comprises providing the language model for use determining n-grams included in an utterance independent from the task associated with the utterance.

10. The method of claim 1, wherein providing the language model for use by the particular automatic speech recognition system to determine n-grams included in an utterance comprising providing the language model to a user device.

11. The method of claim 1, wherein providing the language model for use by the particular automatic speech recognition system to determine n-grams included in an utterance comprises providing the language model for use transcribing the n-grams included in the utterance.

12. A non-transitory computer storage medium encoded with instructions that, when executed by a device, cause the device to perform operations comprising:

receiving, by the device, a set of development sentences W;

receiving a set of two or more language models $G_M$, each language model in the set of two or more language models $G_M$ for use by an automatic speech recognition system when generating text from speech;

determining a set of n-gram language model weights $\lambda_M$ using the development sentences W and the set of two or more language models $G_M$;

determining a set of sentence cluster weights $\gamma_C$, each of the sentence cluster weights corresponding to a cluster in a set of sentence clusters, each cluster in the set of sentence clusters associated with at least one sentence from the set of development sentences W;

generating a language model from the set of two or more language models $G_M$, the set of n-gram language model weights $\lambda_M$, the set of sentence clusters, and the set of sentence cluster weights $\gamma_C$; and providing, by the device, the language model for use by an automatic speech recognition system to determine n-grams included in an utterance encoded in an audio signal.

13. The computer storage medium of claim 12, the operations further comprising:

determining, for each sentence in the set of development sentences W, a probability p of the sentence using the set of n-gram language model weights $\lambda_M$, and the set of sentence cluster weights $\gamma_C$.

14. The computer storage medium of claim 13, wherein the probability p of the sentence w from the set of development sentences W satisfies $$p(w) = \prod_{i=1}^{|w|} \sum_{m=1}^{M} \alpha_{m,h_i} p_m(w_i \mid h_i)$$

where $$\alpha_{m,h_i} = \sum_{c=1}^{C} p(c \mid h_i) \lambda_{c,m},$$

$$p(c \mid h_i) = \frac{p(h_i \mid c)\gamma_c}{\sum_{c=1}^{C} p(h_i \mid c)\gamma_c},$$

-continued $$p(h_i \mid c) = \prod_{j=1}^{i} \sum_{m=1}^{M} \lambda_{c,m} p_m(w_j \mid h_j),$$

$\lambda$ is the n-gram language model weight, $\gamma$ is the sentence cluster weight, C is the quantity of clusters in the set of sentence clusters, M is the quantity of language models in the set of two or more language models $G_M$, |w| is the quantity of n-grams in the sentence w, and $p_{m(w_i|h_i)}$ is the probability that n-gram $w_i$ follows history $h_i$ as estimated by a language model $G_m$ from the set of two or more language models $G_M$.

15. The computer storage medium of claim 13, the operations further comprising:

maximizing a combination of the probabilities by repeating the determination of at least one of the weights in the set of n-gram language model weights $\lambda_M$, the determination of at least one of the weights in the set of sentence cluster weights $\gamma_C$, and the probabilities $p_w$ of the sentences in the set of development sentences W.

16. The computer storage medium of claim 15, wherein:

each of the n-gram language model weights $\lambda_m$ from n-gram language model weights $\lambda_M$ satisfies $$\lambda'_{c,m} = \frac{1}{|c|} \sum_{w \in c} \sum_{i=1}^{|w|} \frac{\lambda_{c,m} p_m(w_i \mid h_i)}{\sum_{j=1}^{M} \lambda_{c,j} p_j(w_j \mid h_j)},$$

and each of the sentence cluster weights $\gamma_c$ from the set of sentence cluster weights $\gamma_C$ satisfies $$\gamma_c = \frac{|c|}{|W|},$$

where c is one of the clusters in the set of sentence clusters, |c| is the quantity of sentences in cluster c, m is a language model from the set of two or more language models $G_M$, M is the quantity of language models in the set of two or more language models $G_M$, |W| is the quantity of sentences in set of development sentences W, |w| is the quantity of n-grams in the sentence w from the set of development sentences W, and $p_m(w_i|h_i)$ is the probability that n-gram $w_i$ follows history $h_i$ as estimated by a language model $G_m$ from the set of two or more language models $G_M$.

17. The computer storage medium of claim 15, wherein:

each of the n-gram language model weights $\lambda_m$ from n-gram language model weights $\lambda_M$ satisfies $$\lambda'_{c,m} = \frac{1}{N_c} \sum_{w \in W} p(c \mid w) \sum_{i=1}^{|w|} \frac{\lambda_{c,m} p_m(w_i \mid h_i)}{\sum_{j=1}^{M} \lambda_{c,j} p_j(w_j \mid h_j)},$$

and each of the sentence cluster weights $\gamma_c$ from the set of sentence cluster weights $\lambda_C$ satisfies $$\gamma'_c = \frac{1}{|W|} \sum_{w \in W} p(c \mid w),$$

where $$N_c = \sum_{w \in W} p(c \mid w)|w|,$$

$$p(c \mid w) = \frac{\gamma_c p_c(w)}{\sum_{i=1}^{C} \gamma_i p_i(w)},$$

$$p_c(w) = \prod_{i=1}^{|w|} \sum_{m=1}^{M} \lambda_{c,m} p_m(w_i \mid h_i),$$

c is one of the clusters in the set of sentence clusters, C is the quantity of clusters in the set of sentence clusters, m is a language model from the set of two or more language models $G_M$, M is the quantity of language models in the set of two or more language models $G_M$, |w| is the quantity of n-grams in the sentence w from the set of development sentences W, and $p_m(w_i|h_i)$ is the probability that n-gram $w_i$ follows history $h_i$ as estimated by a language model $G_m$ from the set of two or more language models $G_M$.

18. A system comprising:

a device and one or more storage devices storing instructions that are operable, when executed by the device, to cause the device to perform operations comprising:

receiving, by the device, a set of development sentences W;

receiving a set of two or more language models $G_M$, each language model in the set of two or more language models $G_M$ for use by an automatic speech recognition system when generating text from speech;

determining a set of n-gram language model weights $\lambda_M$ using the development sentences W and the set of two or more language models $G_M$;

determining a set of sentence cluster weights $\gamma_C$, each of the sentence cluster weights corresponding to a cluster in a set of sentence clusters, each cluster in the set of sentence clusters associated with at least one sentence from the set of development sentences W;

generating a language model from the set of two or more language models $G_M$, the set of n-gram language model weights $\lambda_M$, the set of sentence clusters, and the set of sentence cluster weights $\gamma_C$; and providing, by the device, the language model for use by an automatic speech recognition system to determine n-grams included in an utterance encoded in an audio signal.

19. The system of claim 18, the operations further comprising:

determining, for each sentence in the set of development sentences W, a probability p of the sentence using the set of n-gram language model weights $\lambda_M$, and the set of sentence cluster weights $\gamma_C$.

20. The system of claim 19, the operations further comprising:

maximizing a combination of the probabilities by repeating the determination of at least one of the weights in the set of n-gram language model weights $\lambda_M$, the determination of at least one of the weights in the set of sentence cluster weights $\gamma_C$, and the probabilities $p_w$ of the sentences in the set of development sentences W.

* * * * *